June 21, 1949. W. L. KEENE 2,473,686
COMPOSITE BILLET AND MANUFACTURE THEREOF
Filed Feb. 12, 1946 2 Sheets-Sheet 1
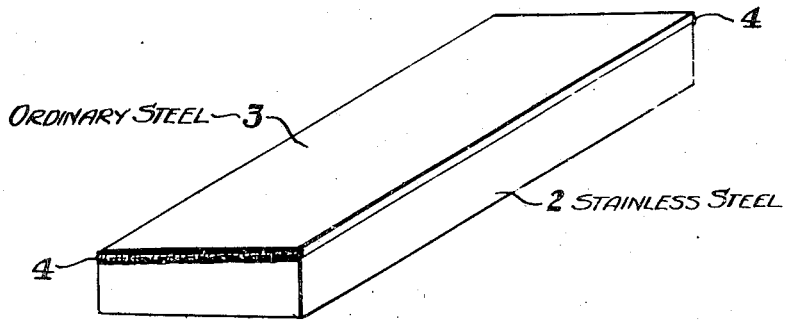
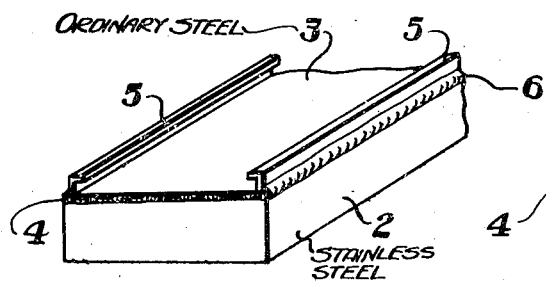
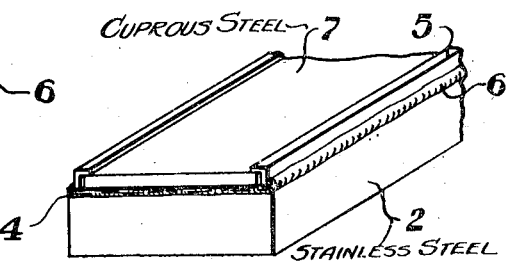
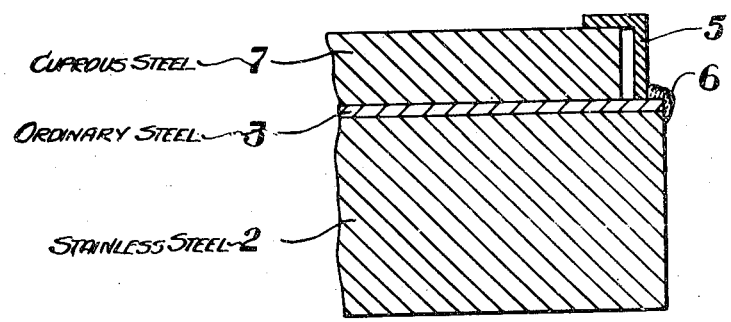
INVENTOR
Walter L. Keene
BY
ATTORNEYS June 21, 1949.    W. L. KEENE    2,473,686
COMPOSITE BILLET AND MANUFACTURE THEREOF
Filed Feb. 12, 1946    2 Sheets-Sheet 2
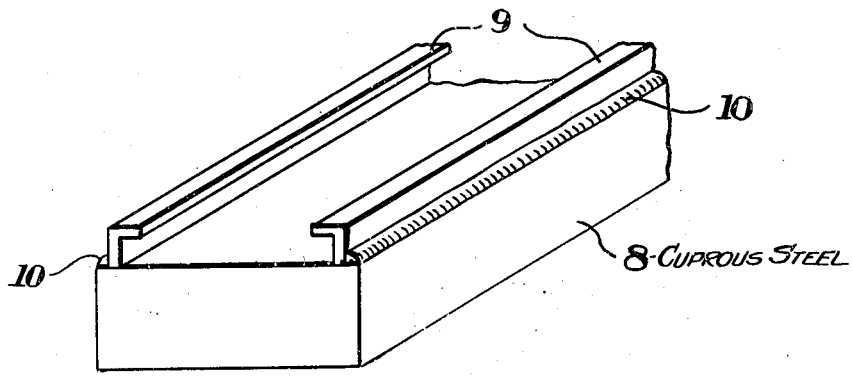
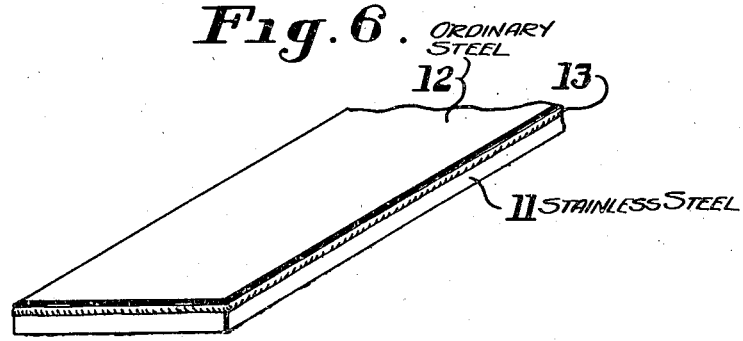
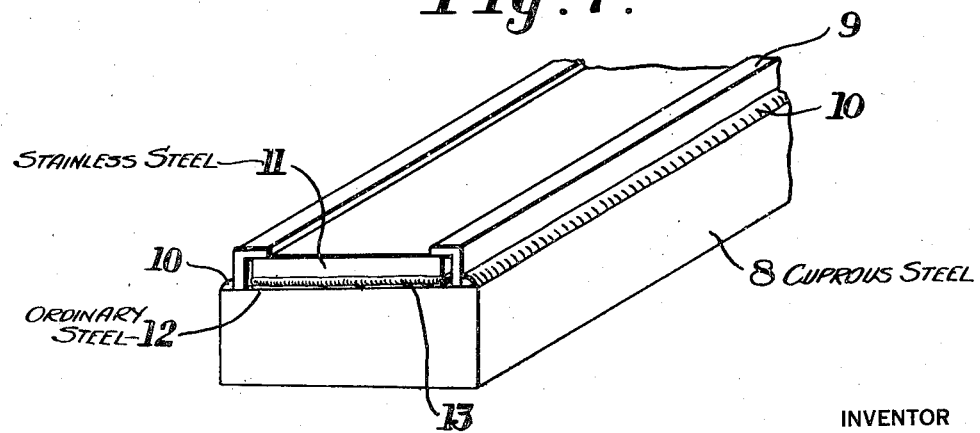
INVENTOR
Walter L. Keene
BY
ATTORNEYS Patented June 21, 1949

2,473,686

UNITED STATES PATENT OFFICE 2,473,686

COMPOSITE BILLET AND MANUFACTURE THEREOF

Walter L. Keene, Dormont, Pa., assignor to Superior Steel Corporation, Carnegie, Pa., a corporation of Virginia Application February 12, 1946, Serial No. 647,015

6 Claims. (Cl. 29—196.1)

This invention relates to composite billets and the manufacture thereof. It relates particularly to the making of composite billets comprising metals which are non-bondable to each other. It relates more particularly to the making of composite billets comprising metals which are non-bondable to each other and one of which is stainless steel.

Considerable experimentation has been done in efforts to provide a satisfactory way of making a composite billet comprising metals which are non-bondable to each other; the problem is especially difficult when one of the metals is stainless steel. An example of a metal non-bondable to stainless steel is copper; indeed cuprous metals generally are non-bondable to stainless steel. Since stainless steel and copper cannot be welded to each other it is not possible to make a composite billet by assembling components of stainless steel and copper and simply welding them together. Yet unless stainless steel is protected against oxidation oxide forms thereon which prevents effective bonding to the stainless steel component of another component even though the latter be of metal which is normally bondable to the stainless steel component.

I provide a method of making a composite billet whereby I can form a billet comprising metals non-bondable to each other, as, for example, stainless steel and copper, and also prevent the formation on the portion of the stainless steel component to which bonding is to be effected of oxide which would interfere with effective bonding. I make a composite billet by assembling components of stainless steel and metal non-bondable to stainless steel with a piece of metal bondable to each of said components therebetween, sealing the edges of said piece of metal to the component of stainless steel and fastening together the assembled components.

I further provide a method of making a composite billet comprising providing a component of stainless steel, applying to said component a piece of metal bondable thereto to cover a portion thereof, sealing the edges of said piece of metal to said component, applying to said piece of metal a second component of metal non-bondable to said first mentioned component but bondable to said piece of metal and fastening said second component to the assembled first mentioned component and piece of metal.

The fastening together of the billet components is preferably effected through the employment of flanges on one component between which the other component may be positioned, the flanges being deformed to press and hold the second component against the first. I form a composite billet by assembling a first component of stainless steel and a second component of metal non-bondable to said first component with a sheet of metal bondable to each of said components therebetween, welding the edges of said sheet to said first component to continuously peripherally seal said sheet to said first component, providing one of said components with opposed flanges and by said flanges fastening together said components.

I also provide a composite billet comprising a first component of stainless steel, a second component of metal non-bondable to said first component and a piece of metal bondable to each of said components disposed therebetween and having its edges sealed to said first component, said components and said piece of metal being fastened together to form a unitary structure capable of being heated and hot rolled. Preferably the fastening is effected by flanges on one of the components.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which Figure 1 is a perspective view of a billet component with a protective sheet applied to a face thereof;

Figure 2 is a fragmentary perspective view of the structure shown in Figure 1 but with opposed flanges welded thereto;

Figure 3 is a view similar to Figure 2 but showing a second component disposed between the flanges and held in place thereby;

Figure 4 is a fragmentary vertical transverse cross-sectional view to enlarged scale of the structure shown in Figure 3;

Figure 5 is a fragmentary perspective view of a billet component having flanges welded thereto;

Figure 6 is a fragmentary perspective view of a billet component with a protective sheet applied to a face thereof; and Figure 7 is a fragmentary perspective view showing the respective components of Figures 5 and 6 assembled and fastened together.

Referring now more particularly to Figures 1 to 4, inclusive, there is provided a billet component in the form of a bar 2 of stainless steel. Applied to one of the principal faces of the bar 2 is a sheet 3 of mild steel. The sheet 3 has its ends welded to the bar 2 as shown at 4. Opposed flanges 5 of inverted L shape are applied to the sheet 3 and are welded thereto by welds 6 extending longitudinally of the structure. The welds 6 also seal the longitudinal edges of the sheet 3 to the longitudinal edges of the bar 2.

Thus the upper face of the bar 2 of stainless steel is protected against oxidation during heating for hot rolling since it is completely covered by the sheet 3 of mild steel which is welded to the bar continuously peripherally of the sheet. The flanges 5 likewise form a unitary part of the structure since they are welded thereto.

After the elements 2, 3 and 5 have been welded together a component 7 in the form of a sheet or plate of copper is applied thereto by being positioned between the flanges 5 against the sheet 3 of mild steel. The component 7 may be introduced longitudinally beneath the inwardly projecting upper ends of the flanges 5. When the component 7 is introduced such inwardly projecting upper ends of the flanges may be slightly raised to permit movement of the component 7 into place, whereupon the flanges may be hammered or otherwise pressed down against the edge portions of the upper face of the component 7 to firmly hold the component 7 in place.

Thus there is made a composite billet comprising a component of stainless steel and a component of copper, and despite the fact that stainless steel and copper are non-bondable to each other the billet may be heated and hot rolled and will produce satisfactory composite strip having its components properly bonded together. When the billet is heated for hot rolling the upper face of the bar 2 of stainless steel is protected against oxidation by the sheet 3 of mild steel. When the billet is hot rolled the bar 2 of stainless steel bonds to the sheet 3 of mild steel and the sheet 3 of mild steel bonds to the component 7 of copper. Instead of being of copper the component 7 may be of any metal non-bondable to stainless steel and bondable to the metal of the sheet 3. The protective sheet 3 may be of any metal bondable to each of the two billet components 2 and 7.

Referring now to Figures 5, 6 and 7, there is shown a billet component 8 of copper having opposed L-shaped flanges 9 welded thereto at 10. There is also shown a component 11 of stainless steel having a sheet 12 of mild steel applied to one of the principal faces thereof and welded thereto continuously peripherally at 13. The assembly 11—12 is inverted with respect to the position in which it is shown in Figure 6 and is applied to the component 8 between the flanges 9 with the sheet 12 disposed against the upper face of the component 8 between the flanges. The assembly 11—12 is held in place on the component 8 by the flanges 9.

When the billet of Figure 7 is heated for hot rolling the under surface of the stainless steel component 11 is protected against oxidation by the sheet 12 of mild steel, and when the billet is hot rolled the copper component 8 bonds to the sheet 12 of mild steel and the stainless steel component 11 also bonds to the sheet 12.

Thus I provide in a simple and economic way for the making of composite billets employing metals which are non-bondable to each other and one of which is stainless steel which without adequate protection would oxidize so as to prevent effective bonding thereto of another billet component.

While I have shown and described certain present preferred embodiments of the invention and certain present preferred methods of practicing the same it is to be distinctly understood that the invention is not limited thereto but may be otherwise variously embodied and practiced within the scope of the following claims.

I claim:

1. A method of making a composite billet comprising assembling billet components of stainless steel and cuprous metal with a sheet of ordinary steel therebetween which is bondable to both the stainless steel and the cuprous metal, sealing the edges of the sheet of ordinary steel to the billet component of stainless steel to protect the stainless steel against oxidation and fastening together the assembled billet components.

2. A method of making a composite billet comprising assembling billet components of stainless steel and cuprous metal with a sheet of ordinary steel therebetween which is bondable to both the stainless steel and the cuprous metal, peripherally continuously welding the edges of the sheet of ordinary steel to the billet component of stainless steel to protect the stainless steel against oxidation, providing one of the billet components with opposed flanges and by said flanges fastening together the assembled billet components.

3. A method of making a composite billet comprising assembling billet components of stainless steel and cuprous metal with a sheet of ordinary steel therebetween which is bondable to both the stainless steel and the cuprous metal, peripherally continuously welding the edges of the sheet of ordinary steel to the billet component of stainless steel to protect the stainless steel against oxidation, welding opposed flanges to the assembly comprising the billet component of stainless steel and the sheet of ordinary steel and by said flanges fastening together the assembled billet components.

4. A composite billet comprising a billet component of stainless steel, a billet component of cuprous metal and a sheet of ordinary steel which is bondable to both the stainless steel and the cuprous metal disposed between the billet component of stainless steel and the billet component of cuprous metal and having its edges sealed to the billet component of stainless steel to protect the stainless steel against oxidation, said billet components being fastened together to form a unitary structure capable of being heated and hot rolled.

5. A composite billet comprising a billet component of stainless steel, a billet component of cuprous metal and a sheet of ordinary steel which is bondable to both the stainless steel and the cuprous metal disposed between the billet component of stainless steel and the billet component of cuprous metal and having its edges peripherally continuously welded to the billet component of stainless steel to protect the stainless steel against oxidation, one of the billet components having flanges, the billet components being by said flanges fastened together to form a unitary structure capable of being heated and hot rolled.

6. A composite billet comprising a billet component of stainless steel, a billet component of cuprous metal and a sheet of ordinary steel which is bondable to both the stainless steel and the cuprous metal disposed between the billet component of stainless steel and the billet component of cuprous metal and having its edges peripherally continuously welded to the billet component of stainless steel to protect the stainless steel against oxidation, the assembly comprising the billet component of stainless steel and the sheet of ordinary steel having flanges welded thereto, the billet components being by said flanges fastened together to form a unitary structure capable of being heated and hot rolled.

WALTER L. KEENE.

REFERENCES CITED

The following references are of record in the file of this patent:

UNITED STATES PATENTS

| Number | Name | Date |
| --- | --- | --- |
| 1,746,987 | Bennett | Feb. 11, 1930 |
| 1,896,411 | Maskrey | Feb. 7, 1933 |
| 1,996,721 | Gibbs | Apr. 2, 1935 |
| 2,057,254 | Sommer | Oct. 13, 1936 |
| 2,145,248 | Chace | Jan. 31, 1939 |

FOREIGN PATENTS

| Number | Country | Date |
| --- | --- | --- |
| 407,942 | Great Britain | Mar. 26, 1934 |

Certificate of Correction

Patent No. 2,473,686. June 21, 1949.

WALTER L. KEENE

It is hereby certified that errors appear in the above numbered patent requiring correction as follows:

In the drawings, Figures 3, 4, 5, and 7 should appear as shown below instead of as in the patent:

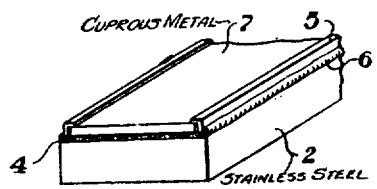

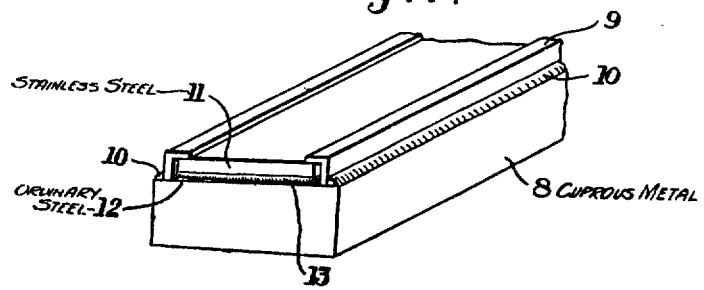

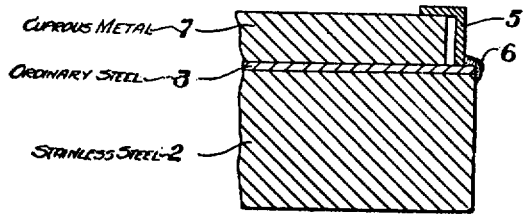

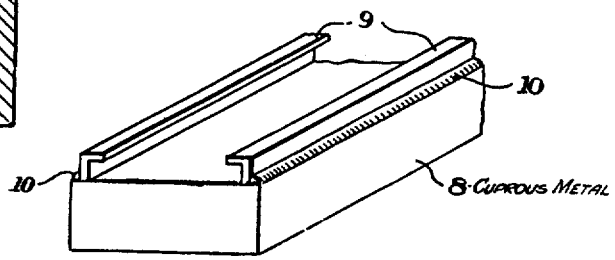

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*